United States Patent
Wakitani et al.

(10) Patent No.: US 11,795,256 B2
(45) Date of Patent: Oct. 24, 2023

(54) PRODUCTION METHOD FOR CYCLIC OLEFIN COPOLYMER AND CATALYST COMPOSITION FOR COPOLYMERIZATION OF NORBORNENE MONOMER AND ETHYLENE

(71) Applicant: Polyplastics Co., Ltd., Tokyo (JP)

(72) Inventors: Naoyuki Wakitani, Fuji (JP); Tomoyuki Tada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 18/003,424

(22) PCT Filed: Jun. 23, 2021

(86) PCT No.: PCT/JP2021/023826
§ 371 (c)(1),
(2) Date: Dec. 27, 2022

(87) PCT Pub. No.: WO2022/004529
PCT Pub. Date: Jan. 6, 2022

(65) Prior Publication Data
US 2023/0192930 A1    Jun. 22, 2023

(30) Foreign Application Priority Data
Jun. 29, 2020    (JP) .................. 2020-111975

(51) Int. Cl.
| | | |
|---|---|---|
| *C08F 4/64* | (2006.01) | |
| *C08F 4/76* | (2006.01) | |
| *C08F 232/04* | (2006.01) | |
| *C08F 2/06* | (2006.01) | |
| *C08F 4/08* | (2006.01) | |
| *C08F 4/30* | (2006.01) | |
| *C08K 3/02* | (2006.01) | |
| C08F 232/06 | (2006.01) | |
| C08F 4/6592 | (2006.01) | |

(52) U.S. Cl.
CPC ............. *C08F 232/04* (2013.01); *C08F 2/06* (2013.01); *C08F 4/083* (2013.01); *C08F 4/30* (2013.01); *C08F 4/76* (2013.01); *C08K 3/02* (2013.01); *C08F 4/6592* (2013.01); *C08F 232/06* (2013.01); *C08F 2410/04* (2013.01); *C08K 2003/026* (2013.01)

(58) Field of Classification Search
CPC ..... C08F 232/04; C08F 210/02; C08F 4/6592
See application file for complete search history.

(56) References Cited

U.S. PATENT DOCUMENTS

| | | | | |
|---|---|---|---|---|
| 5,965,677 A | * | 10/1999 | Stephan | C08F 10/00 502/103 |
| 6,147,172 A | * | 11/2000 | Brown | C08F 10/00 502/103 |
| 6,235,672 B1 | * | 5/2001 | McKay | C08F 10/00 502/103 |
| 6,239,061 B1 | * | 5/2001 | Wang | C08F 10/02 556/14 |
| 6,239,238 B1 | * | 5/2001 | Brown | C07F 7/28 526/348 |
| 6,355,744 B1 | * | 3/2002 | von Haken Spence | C07F 9/5355 502/155 |
| 6,486,276 B1 | * | 11/2002 | Wang | C08F 210/18 526/348 |
| 6,740,724 B2 | * | 5/2004 | Wang | C08F 210/02 526/160 |
| 7,829,645 B2 | * | 11/2010 | Windmuller | C08F 210/18 502/103 |
| 9,546,233 B2 | * | 1/2017 | Scott | C07F 17/00 |
| 2005/0004331 A1 | | 1/2005 | Sun | |

FOREIGN PATENT DOCUMENTS

| | | |
|---|---|---|
| CN | 108864348 A | 11/2018 |
| CN | 109535286 A | 3/2019 |
| CN | 109535289 A | 3/2019 |
| CN | 109535298 A | 3/2019 |
| CN | 110387003 A | 10/2019 |
| EP | 3305815 A1 | 4/2018 |
| JP | 2005-239910 A | 9/2005 |
| JP | 2006-233063 A | 9/2006 |
| JP | 2006-265541 A | 10/2006 |

(Continued)

OTHER PUBLICATIONS

Incoronata, Tritto et al.,Coordination Chemistry Reviews, 2006, vol. 250, p. 212-241, Sep. 2, 2005.

(Continued)

Primary Examiner — Rip A Lee
(74) Attorney, Agent, or Firm — Knobbe, Martens, Olson & Bear, LLP

(57) ABSTRACT

A production method for a cyclic olefin copolymer which is capable of efficiently producing a cyclic olefin copolymer by copolymerizing monomers including a norbornene monomer and ethylene while suppressing the formation of a polyethylene-like impurity, and a catalyst composition for the copolymerization of a norbornene monomer and ethylene. Monomers including a norbornene monomer and ethylene are polymerized in the presence of a metal-containing catalyst, and the metal-containing catalyst has a structure in which a nitrogen atom is bonded to a transition metal of Group 4 of the periodic table and an atom of Group 15 of the periodic table.

7 Claims, No Drawings

(56) References Cited

FOREIGN PATENT DOCUMENTS

| JP | 2012-046764 A | 3/2012 |
| JP | 2018-150273 A | 9/2018 |
| JP | 2019-172954 A | 10/2019 |
| JP | 2020-164790 A | 10/2020 |

OTHER PUBLICATIONS

Nomura, Kotohiro et al., "Olefin polymerization by half-titanocenes containing 172-pyrazolato ligands-MAO catalyst systems", Macromolecules, 2011, 44, 1986-1998, DOI: 10.1021/ma200018z scheme 2, Mar. 4, 2011.

Terao, Hirosh et al., "Ethylene/Norbornene Copolymerization Behavior of Bis(phenoxy-imine)Ti Complexes Combined with MAO", Macromolecules, 2009, 42, 4359-4361, Jun. 11, 2009.

\* cited by examiner

PRODUCTION METHOD FOR CYCLIC OLEFIN COPOLYMER AND CATALYST COMPOSITION FOR COPOLYMERIZATION OF NORBORNENE MONOMER AND ETHYLENE

This application is the U.S. National Phase under 35 U.S.C. § 371 of International Application PCT/JP2021/023826, filed Jun. 23, 2021, designating the U.S., and published in Japanese as WO 2022/004529 on Jan. 6, 2022, which claims priority to Japanese Patent Application No. 2020-111975, filed Jun. 29, 2020, the entire content of which is incorporated herein by reference.

TECHNICAL FIELD

The present invention relates to a method for producing a cyclic olefin copolymer including a structural unit derived from a norbornene monomer and a structural unit derived from ethylene, and a catalyst composition for the copolymerization of a norbornene monomer and ethylene.

BACKGROUND ART

Cyclic olefin homopolymers and copolymers have low hygroscopicity and high transparency, and find use in various applications including the field of optical materials such as optical disc substrates, optical films, optical fibers. Copolymers of a cyclic olefin and ethylene, which are in widespread use as transparent resins, typify such cyclic olefin copolymers. The copolymers of a cyclic olefin and ethylene can have variable glass transition temperatures (Tg) depending on the copolymerization composition thereof, and therefore copolymers having the glass transition temperature thereof tuned in a wide temperature range can be produced (see, for example, Nonpatent Document 1).
Non-Patent Document 1: Incoronata, Tritto et al., Coordination Chemistry Reviews, 2006, vol. 250, pp. 212-241

DISCLOSURE OF THE INVENTION

Problems to be Solved by the Invention

Unfortunately, the methods described in Nonpatent Document 1 have difficulty producing the copolymers of a cyclic olefin and ethylene in high yields. A possible solution for this difficulty is to conduct the polymerization using a highly active catalyst. However, when the polymerization is conducted using a highly active catalyst for the purpose of increasing the production efficiency of the cyclic olefin copolymers, a polyethylene-like impurity may be more readily co-produced. When a cyclic olefin copolymer contains a polyethylene-like impurity, such a cyclic olefin copolymer is highly likely to give a turbid solution upon the dissolution thereof in a solvent. As can also be understood from such a phenomenon, the inclusion of the polyethylene-like impurity in the cyclic olefin copolymer would impair the transparency of the cyclic olefin copolymer. Furthermore, the formation of the polyethylene-like impurity would require a process for filtering and removing the insoluble polyethylene-like impurity in a common production process for the production of the cyclic olefin copolymer, which would increase production costs.

The present invention takes the above circumstances into consideration, with an object of providing a production method for a cyclic olefin copolymer, which is capable of efficiently producing a cyclic olefin copolymer by copolymerizing monomers including a norbornene monomer and ethylene while suppressing the formation of a polyethylene-like impurity, and a catalyst composition for the copolymerization of a norbornene monomer and ethylene, which is suitably used in the production method as described above.

Means for Solving the Problems

The present inventors found that the above-mentioned problems can be solved by using, in the polymerization of monomers including a norbornene monomer and ethylene in the presence of a metal-containing catalyst, a metal-containing catalyst having a structure in which a nitrogen atom is bonded to a transition metal of Group 4 of the periodic table and an atom of Group 15 of the periodic table, to accomplish the present invention. More specifically, the present invention provides the following.

A first aspect of the present invention provides a method for producing a cyclic olefin copolymer including a structural unit derived from a norbornene monomer and a structural unit derived from ethylene, the method including:

charging at least a norbornene monomer and ethylene as monomers into a polymerization vessel, and polymerizing the monomers in the polymerization vessel in the presence of a metal-containing catalyst, the metal-containing catalyst having a structure in which a nitrogen atom is bonded to a transition metal of Group 4 of the periodic table and an atom of Group 15 of the periodic table.

A second aspect of the present invention provides the method for producing a cyclic olefin copolymer according to the first aspect, wherein the atom of Group 15 of the periodic table is a phosphorus atom.

A third aspect of the present invention provides the method for producing a cyclic olefin copolymer according to the first or second aspect, wherein the metal-containing catalyst is a metal-containing compound represented by the following formula (a1):

(a1)

wherein in the formula (a1), M represents Ti, Zr or Hf, X represents an organic substituent having 1 to 20 carbon atoms and optionally containing a heteroatom, or a halogen atom, $L^1$ represents a group represented by the following formula (a1a) or (a1b):

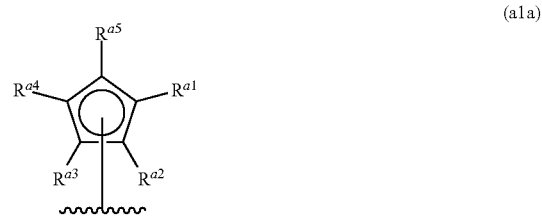

(a1a)

-continued

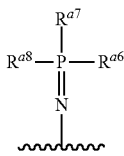
(a1b)

wherein in the formula (a1a), $R^{a1}$ to $R^{a5}$ may be identical to or different from one another, and each independently represent a hydrogen atom, an organic substituent having 1 to 20 carbon atoms and optionally containing a heteroatom, or an inorganic substituent, and two groups adjacent on the 5-membered ring of $R^{a1}$ to $R^{a5}$ are optionally bonded to each other to form a ring, wherein in the formula (a1b), $R^{a6}$ to $R^{a8}$ may be identical to or different from one another, and each independently represent a hydrogen atom, an organic substituent having 1 to 20 carbon atoms and optionally containing a heteroatom, or an inorganic substituent, two groups selected from $R^{a6}$ to $R^{a8}$ are optionally bonded to each other to form a ring, and $L^2$ represents the group represented by the formula (a1b).

A fourth aspect of the present invention provides the method for producing a cyclic olefin copolymer according to any one of the first to third aspects, wherein the transition metal of Group 4 of the periodic table is Ti.

A fifth aspect of the present invention provides the method for producing a cyclic olefin copolymer according to any one of the first to fourth aspects, wherein the polymerizing of the monomers is performed in the presence of the metal-containing catalyst and a co-catalyst.

A sixth aspect of the present invention provides the method for producing a cyclic olefin copolymer according to the fifth aspect, wherein the co-catalyst includes at least one of an aluminoxane and a borate compound.

A seventh aspect of the present invention provides the method for producing a cyclic olefin copolymer according to any one of the first to sixth aspects, wherein the polymerizing of the monomers is performed in the presence of a hydrocarbon solvent.

An eighth aspect of the present invention provides the method for producing a cyclic olefin copolymer according to any one of the first to seventh aspects, wherein a DSC curve obtained in the measurement of a sample of the cyclic olefin copolymer according to the method defined in JIS K7121 using a differential scanning calorimeter in a nitrogen atmosphere under the condition of a rate of temperature increase of 20° C./min shows no peak of a melting point assigned to a polyethylene-like impurity in the range of 100° C. to 140° C.

A ninth aspect of the present invention provides a catalyst composition for the copolymerization of a norbornene monomer and ethylene, including a metal-containing catalyst having a structure in which a nitrogen atom is bonded to a transition metal of Group 4 of the periodic table and an atom of Group 15 of the periodic table.

A tenth aspect of the present invention provides the catalyst composition for the copolymerization of a norbornene monomer and ethylene according to the ninth aspect, wherein the atom of Group 15 of the periodic table is a phosphorus atom.

An eleventh aspect of the present invention provides the catalyst composition for the copolymerization of a norbornene monomer and ethylene according to the ninth or tenth aspect, wherein the metal-containing catalyst is a metal-containing compound represented by the following formula (a1):

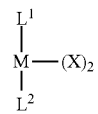
(a1)

wherein in the formula (a1), M represents Ti, Zr or Hf, X represents an organic substituent having 1 to 20 carbon atoms and optionally containing a heteroatom, or a halogen atom, $L^1$ represents a group represented by the following formula (a1a) or (a1b)

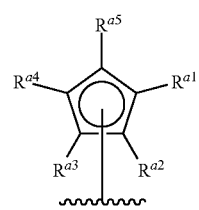
(a1a)

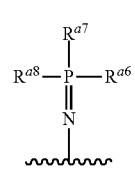
(a1b)

wherein in the formula (a1a), $R^{a1}$ to $R^{a5}$ may be identical to or different from one another, and each independently represent a hydrogen atom, an organic substituent having 1 to 20 carbon atoms and optionally containing a heteroatom, or an inorganic substituent, two groups adjacent on the 5-membered ring of $R^{a1}$ to $R^{a5}$ are optionally bonded to each other to form a ring, wherein in the formula (a1b), $R^{a6}$ to $R^{a8}$ may be identical to or different from one another, and each independently represent a hydrogen atom, an organic substituent having 1 to 20 carbon atoms and optionally containing a heteroatom, or an inorganic substituent, two groups selected from $R^{a6}$ to $R^{a8}$ are optionally bonded to each other to form a ring, and $L^2$ represents the group represented by the formula (a1b).

A twelfth aspect of the present invention provides the catalyst composition for the copolymerization of a norbornene monomer and ethylene according to any one of the ninth to eleventh aspects, wherein the transition metal of Group 4 of the periodic table is Ti.

A thirteenth aspect of the present invention provides the catalyst composition for the copolymerization of a norbornene monomer and ethylene according to any one of the ninth to twelfth aspects, further including a co-catalyst.

A fourteenth aspect of the present invention provides the catalyst composition for the copolymerization of a norbornene monomer and ethylene according to the thirteenth aspect, wherein the co-catalyst includes at least one of an aluminoxane and a borate compound.

Effects of the Invention

The present invention can provide a production method for a cyclic olefin copolymer, which is capable of efficiently producing a cyclic olefin copolymer by copolymerizing monomers including a norbornene monomer and ethylene while suppressing the formation of a polyethylene-like impurity, and a catalyst composition for the copolymerization of a norbornene monomer and ethylene, which is suitably used in the production method as described above.

Preferred Mode for Carrying Out the Invention

<<Production Method for Cyclic Olefin Copolymer>>

In the production method for a cyclic olefin copolymer, a cyclic olefin copolymer including a structural unit derived from a norbornene monomer and a structural unit derived from ethylene is produced.

The production method includes:
charging at least a norbornene monomer and ethylene as monomers into a polymerization vessel, and
polymerizing the monomers in the polymerization vessel in the presence of a metal-containing catalyst. Hereinafter, the charging of the norbornene monomer and ethylene as the monomer into the polymerization vessel is also referred to as a charging step. Further, the polymerizing of the monomers in the polymerization vessel in the presence of the metal-containing catalyst is also referred to as a polymerization step.

The monomers in the polymerization vessel are polymerized in the presence of the metal-containing catalyst. The metal-containing catalyst used in the polymerization has a structure in which a nitrogen atom is bonded to a transition metal of Group 4 of the periodic table and an atom of Group 15 of the periodic table.

In the copolymerization of ethylene and a norbornene monomer in the presence of a highly active catalyst, ethylene homopolymerization is generally likely to proceed, more readily leading to the formation of a polyethylene-like impurity.

However, the polymerization of ethylene and the norbornene monomer using the metal-containing catalyst having the structure as defined above is likely to produce the cyclic olefin copolymer in a favorable yield, while suppressing the formation of the polyethylene-like impurity.

<Charging Step>

In the charging step, the norbornene monomer and ethylene are charged as the monomers into a polymerization vessel. Any monomer other than the norbornene monomer and ethylene may be charged into the polymerization vessel, so long as the effects of the present invention is not impaired. The sum of the ratio of the structural units derived from the norbornene monomer and the ratio of the structural units derived from ethylene in the cyclic olefin copolymer is typically preferably 80% by mass or more, more preferably 95% by mass or more, and even more preferably 98% by mass or more based on the total structural units.

The monomer other than the norbornene monomer and ethylene is not particularly limited so long as it is copolymerizable with the norbornene monomer and ethylene. Typical examples of such other monomer include α-olefins. Such an α-olefin may be substituted with at least one substituent such as a halogen atom.

The α-olefin is preferably a C3 to C12 α-olefin. The C3 to C12 α-olefin is not particularly limited, and examples thereof include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, etc. Among these, 1-hexene, 1-octene and 1-decene are preferable.

The way of charging ethylene into the polymerization solution is not particularly limited, so long as the desired amount of ethylene can be charged into the polymerization vessel. Ethylene is typically charged into the polymerization vessel so as to achieve a charge pressure of ethylene in the polymerization vessel of 0.5 MPa or more. The charge pressure of ethylene is preferably 0.55 MPa or more, and more preferably 0.6 MPa or more. When the charge pressure of ethylene is high, the amount of the catalyst used per product polymer can be reduced. The upper limit of the charge pressure of ethylene is, for example, preferably 10 MPa or less, more preferably 5 MPa or less, and even more preferably 3 MPa or less.

A solvent may be charged into the polymerization vessel together with the norbornene monomer and ethylene.

The solvent is not particularly limited, so long as the solvent does not inhibit the polymerization reaction. Examples of a preferable solvent include a hydrocarbon solvent and a halogenated hydrocarbon solvent, and a hydrocarbon solvent is preferable in light of its excellent handling characteristics, thermal stability and chemical stability. Specific examples of the preferable solvent include hydrocarbon solvents such as pentane, hexane, heptane, octane, isooctane, isododecane, mineral oils, cyclohexane, methylcyclohexane, decahydronaphthalene (decalin), benzene, toluene and xylene, and halogenated hydrocarbon solvents such as chloroform, methylene chloride, dichloromethane, dichloroethane and chlorobenzene.

In the case where the norbornene monomer is charged into the solvent, the lower limit of the concentration of the norbornene monomer is, for example, preferably 0.5% by mass or more, and more preferably 10% by mass or more. The upper limit of the concentration of the norbornene monomer is, for example, preferably 50% by mass or less, and even more preferably 35% by mass or less.

In the following, the norbornene monomer will be described.

[Norbornene Monomer]

Examples of the norbornene monomer include norbornene and a substituted norbornene, and norbornene is preferable. One type of the norbornene monomer may be used alone, and two or more types of norbornene monomers may be used in combination.

The substituted norbornene is not particularly limited, and examples of a substituent included in the substituted norbornene include a halogen atom and a monovalent or divalent hydrocarbon group.

Specific examples of the substituted norbornene include a compound represented by the following general formula (I).

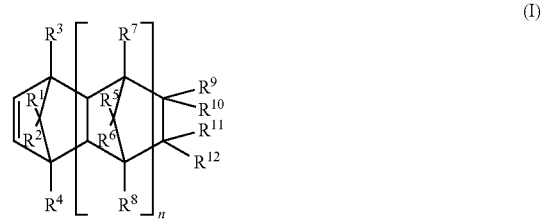

(I)

In the formula (I), $R^1$ to $R^{12}$ may be identical to or different from one another, and are each independently selected from the group consisting of a hydrogen atom, a halogen atom and a hydrocarbon group, $R^9$ and $R^{10}$, and $R^{11}$ and $R^{12}$ optionally combine to form a divalent hydrocarbon group, $R^9$ or $R^{10}$ and $R^{11}$ or $R^{12}$ optionally form a ring with each other. Further, n represents 0 or a positive integer, and when n is two or more, $R^5$ to $R^8$ may be identical to or different from each other in the respective repeating units. In addition, when n is 0, at least one of $R^1$ to $R^4$ and $R^9$ to $R^{12}$ is not a hydrogen atom.

The substituted norbornene represented by the general formula (I) will be described. $R^1$ to $R^{12}$ in the general formula (I) may be identical to or different from one another, and are each independently selected from the group consisting of a hydrogen atom, a halogen atom and a hydrocarbon group.

Specific examples of $R^1$ to $R^8$ include a hydrogen atom; a halogen atom such as fluorine, chlorine and bromine; an alkyl group having 1 to 20 carbon atoms, and the like, and $R^1$ to $R^8$ may be different from each other, a part of $R^1$ to $R^8$ may be different from one another, and all of $R^1$ to $R^8$ may be identical to one another.

Further, specific examples of $R^9$ to $R^{12}$ include a hydrogen atom; a halogen atom such as fluorine, chlorine and bromine; an alkyl group having 1 to 20 carbon atoms; a cycloalkyl group such as a cyclohexyl group; a substituted or unsubstituted aromatic hydrocarbon group such as a phenyl group, a tolyl group, an ethylphenyl group, an isopropylphenyl group, a naphthyl group and an anthryl group; an aralkyl group such as a benzyl group, a phenethyl group, and other aryl-group-substituted alkyl group, and the like, and $R^9$ to $R^{12}$ may be different from each other, a part of $R^9$ to $R^{12}$ may be different from one another, and all of $R^9$ to $R^{12}$ may be identical to one another.

Specific examples of the divalent hydrocarbon group when $R^9$ and $R^{10}$, or $R^{11}$ and $R^{12}$ taken together form a divalent hydrocarbon group include an alkylidene group such as an ethylidene group, a propylidene group and an isopropylidene group, and the like.

When $R^9$ or $R^{10}$ and $R^{11}$ or $R^{12}$ form a ring with each other, the ring formed thereby may be a monocyclic or polycyclic ring, a bridged polycyclic ring, or a ring having a double bond, or may be a ring having a combination of these rings. In addition, these rings may have a substituent such as a methyl group.

Specific examples of the substituted norbornene represented by the general formula (I) include: bicyclic olefins such as 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene, 5-propenyl-bicyclo[2.2.1]hept-2-ene;

tricyclic olefins such as tricyclo[4.3.0.1$^{2,5}$]deca-3,7-diene (trivial name: dicyclopentadiene), tricyclo[4.3.0.1$^{2,5}$]deca-3-ene; tricyclo[4.4.0.1$^{2,5}$]undeca-3,7-diene or tricyclo[4.4.0.1$^{2,5}$]undeca-3,8-diene or a partially hydrogenated product thereof (or an adduct of cyclopentadiene and cyclohexene), i.e., tricyclo[4.4.0.1$^{2,5}$]undeca-3-ene; 5-cyclopentyl-bicyclo[2.2.1]hept-2-ene, 5-cyclohexyl-bicyclo[2.2.1]hept-2-ene, 5-cyclohexenylbicyclo[2.2.1]hept-2-ene and 5-phenyl-bicyclo[2.2.1]hept-2-ene;

tetracyclic olefins such as tetracyclo[4.4.0.1$^{2,5}$.1$^{7,10}$]dodeca-3-ene (which may be referred to simply as tetracyclododecene), 8-methyltetracyclo[4.4.0.1$^{2,5}$.1$^{7,10}$]dodeca-3-ene, 8-ethyltetracyclo[4.4.0.1$^{2,5}$.1$^{7,10}$]dodeca-3-ene, 8-methylidenetetracyclo[4.4.0.1$^{2,5}$.1$^{7,10}$]dodeca-3-ene, 8-ethylidenetetracyclo[4.4.0.1$^{2,5}$.1$^{7,10}$]dodeca-3-ene, 8-vinyltetracyclo[4.4.0.1$^{2,5}$.1$^{7,10}$]dodeca-3-ene and 8-propenyl-tetracyclo[4.4.0.1$^{2,5}$.1$^{7,10}$]dodeca-3-ene; and polycyclic olefins such as 8-cyclopentyl-tetracyclo[4.4.0.1$^{2,5}$.1$^{7,10}$]dodeca-3-ene, 8-cyclohexyl-tetracyclo[4.4.0.1$^{2,5}$.1$^{7,10}$]dodeca-3-ene, 8-cyclohexenyl-tetracyclo[4.4.0.1$^{2,5}$.1$^{7,10}$]dodeca-3-ene, 8-phenyl-cyclopentyl-tetracyclo[4.4.0.1$^{2,5}$.1$^{7,10}$]dodeca-3-ene; tetracyclo[7.4.1$^{3,6}$.0$^{1,9}$.0$^{2,7}$]tetradeca-4,9,11,13-tetraene (which may also be referred to as 1,4-methano-1,4,4a,9a-tetrahydrofluorene), tetracyclo[8.4.1$^{4,7}$.0$^{1,10}$.0$^{3,8}$]pentadeca-5,10,12,14-tetraene (which may also be referred to as 1,4-methano-1,4,4a,5,10,10a-hexahydroanthracene); pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene; heptacyclo[8.7.0.1$^{2,9}$.1$^{4,7}$.1$^{11,17}$.0$^{3,8}$.0$^{12,16}$]-5-eicosene, heptacyclo[8.7.0.1$^{2,9}$.0$^{3,8}$.1$^{4,7}$.0$^{12,17}$.1$^{13,16}$]-14-eicosene; and a tetramer of cyclopentadiene.

Among these, alkyl-substituted norbornenes (e.g., bicyclo[2.2.1]hept-2-ene substituted with one or more alkyl group(s)), alkylidene-substituted norbornenes (e.g., bicyclo[2.2.1]hept-2-ene substituted with one or more alkylidene group(s)) are preferable, and 5-ethylidene-bicyclo[2.2.1]hept-2-ene (trivial name: 5-ethylidene-2-norbornene, or simply ethylidenenorbornene) is particularly preferable.

<Polymerization Step>

In the polymerization step, the monomers in the polymerization vessel are polymerized in the presence of the metal-containing catalyst that satisfies the predetermined requirements. The temperature during polymerization is not particularly limited. The temperature during polymerization is preferably 20° C. or higher, more preferably 30° C. or higher, even more preferably 50° C. or higher, still more preferably 60° C. or higher, and particularly preferably 70° C. or higher because of a favorable yield of the cyclic olefin copolymer, etc. The temperature during polymerization may be 80° C. or higher. The upper limit of the temperature during polymerization is not particularly limited, and may be, for example, 200° C. or lower, 140° C. or lower, or 120° C. or lower.

As the metal-containing catalyst, a metal-containing compound having a structure in which a nitrogen atom is bonded to a transition metal of Group 4 of the periodic table and an atom of Group 15 of the periodic table is used. Such a catalyst can favorably produce the cyclic olefin copolymer, while suppressing the formation of a polyethylene-like impurity.

The transition metal of Group 4 of the periodic table in the metal-containing catalyst is preferably Ti, Zr or Hf, and more preferably Ti. Further, the atom of Group 15 of the periodic table in the metal-containing catalyst is preferably P, As or Sb, and more preferably P.

The metal-containing catalyst preferably has a ligand coordinating to the transition metal of Group 4 of the periodic table. A ligand containing a cyclopentadiene ring is preferable as the ligand in light of high activity of the metal-containing catalyst.

Suitable examples of the ligand containing a cyclopentadiene ring, which is included in metal-containing catalyst, include cyclopentadiene, methylcyclopentadiene, dimethylcyclopentadiene, trimethylcyclopentadiene, tetramethylcyclopentadiene, pentamethylcyclopentadiene, n-butylcyclopentadiene, di-n-butylcyclopentadiene, tert-butylcyclopentadiene, di-tert-butylcyclopentadiene, adamantylcyclopentadiene, monomethylindene, dimethylindene, trimethylindene, tetramethylindene, 4,5,6,7-tetrahydroindene, fluorene, 5,10-dihydroindeno[1,2-b]indole, N-methyl-5,10-dihydroindeno[1,2-b]indole, N-phenyl-5,10-dihydroindeno[1,2-b]indole, 5,6-dihydroindeno[2,1-b]indole, N-methyl-5,6-dihydroindeno[2,1-b]indole and N-phenyl-5,6-dihydroindeno[2,1-b]indole.

Suitable examples of such a metal-containing catalyst include a metal-containing compound represented by the following formula (a1).

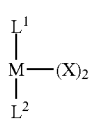

(a1)

In the formula (a1), M represents Ti, Zr or Hf, and particularly preferably is Ti in light of ease of access to and production of the metal-containing catalyst, as well as the activity of the catalyst, etc. X represents an organic substituent having 1 to 20 carbon atoms and optionally containing a heteroatom, or a halogen atom. $L^1$ represents a group represented by the following formula (a1a) or (a1b), and more preferably a group represented by the following formula (a1a) in light of the catalyst activity. Further, $L^2$ represents a group represented by the following formula (a1b). In the formula (a1), when both of $L^1$ and $L^2$ are a group represented by the formula (a1b), $L^1$ and $L^2$ may represent an identical group or a different group, and preferably represent an identical group.

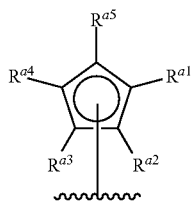

(a1a)

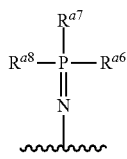

(a1b)

In the formula (a1a), $R^{a1}$ to $R^{a5}$ may be identical to or different from one another, and each independently represent a hydrogen atom, an organic substituent having 1 to 20 carbon atoms and optionally containing a heteroatom, or an inorganic substituent. Two groups adjacent on the 5-membered ring of $R^{a1}$ to $R^{a5}$ are optionally bonded to each other to form a ring. In the formula (a1b), $R^{a6}$ to $R^{a8}$ may be identical to or different from one another, and each independently represent a hydrogen atom, an organic substituent having 1 to 20 carbon atoms and optionally containing a heteroatom, or an inorganic substituent. Two groups selected from $R^{a6}$ to $R^{a8}$ are optionally bonded to each other to form a ring.

In the formula (a1), X represents an organic substituent having 1 to 20 carbon atoms and optionally containing a heteroatom, or a halogen atom. With regard to the organic substituent having 1 to 20 carbon atoms and optionally containing a heteroatom, when the organic substituent contains a heteroatom, the type of the heteroatom is not particularly limited, so long as the effects of the present invention are not impaired. Specific examples of the heteroatom include an oxygen atom, a nitrogen atom, a sulfur atom, a phosphorus atom, a silicon atom, a selenium atom, a halogen atom, etc.

The organic substituent is not particularly limited, so long as it does not inhibit the formation reaction of the metal-containing compound represented by the formula (a1). Examples of the organic substituent include an alkyl group having 1 to 20 carbon atoms, an alkoxy group having 1 to 20 carbon atoms, a cycloalkyl group having 3 to 20 carbon atoms, an aliphatic acyl group having 2 to 20 carbon atoms, a benzoyl group, an α-naphthylcarbonyl group, a β-naphthylcarbonyl group, an aromatic hydrocarbon group having 6 to 20 carbon atoms, an aralkyl group having 7 to 20 carbon atoms, a trialkylsilyl group having 3 to 20 carbon atoms, a monosubstituted amino group substituted with a hydrocarbon group having 1 to 20 carbon atoms, and a disubstituted amino group substituted with a hydrocarbon group having 1 to 20 carbon atoms.

Among these organic substituents, an alkyl group having 1 to 6 carbon atoms, alkoxy group having 1 to 6 carbon atoms, a cycloalkyl group having 3 to 8 carbon atoms, an aliphatic acyl group having 2 to 6 carbon atoms, a benzoyl group, a phenyl group, a benzyl group, a phenethyl group and a trialkylsilyl group having 3 to 10 carbon atoms are preferable.

Among the organic substituents, a methyl group, an ethyl group, an n-propyl group, an isopropyl group, an n-butyl group, an isobutyl group, a sec-butyl group, a tert-butyl group, a methoxy group, an ethoxy group, an n-propyloxy group, an isopropyloxy group, an n-butyloxy group, an isobutyloxy group, a sec-butyloxy group, a tert-butyloxy group, an acetyl group, a propionyl group, a butanoyl group, a phenyl group, a trimethylsilyl group and a tert-butyldimethylsilyl group are more preferable.

X represents preferably a halogen atom, more preferably a chlorine atom and a bromine atom, and particularly preferably a chlorine atom.

In the formula (a1a), $R^{a1}$ to $R^{a5}$ may be identical to or different from one another, and each independently represent a hydrogen atom, an organic substituent having 1 to 20 carbon atoms and optionally containing a heteroatom, or an inorganic substituent. Further, two groups adjacent on the 5-membered ring of $R^{a1}$ to $R^{a5}$ are optionally bonded to each other to form a ring. Specific examples and preferable examples of the organic substituent having 1 to 20 carbon atoms and optionally containing a heteroatom, as $R^{a1}$ to $R^{a5}$, are the same as the specific examples and preferable examples of the organic substituent having 1 to 20 carbon atoms and optionally containing a heteroatom, as X, respectively.

The inorganic substituent is not particularly limited, so long as it does not inhibit the formation reaction of the metal-containing compound represented by the formula (a1). Specific examples of the inorganic substituent include a halogen atom, a nitro group, an unsubstituted amino group, a cyano group, etc.

In the formula (a1b), $R^{a6}$ to $R^{a8}$ may be identical to or different from one another, and each independently represent a hydrogen atom, an organic substituent having 1 to 20 carbon atoms and optionally containing a heteroatom, or an inorganic substituent. Further, two groups selected from $R^{a6}$ to $R^{a8}$ are optionally bonded to each other to form a ring. Specific examples and preferable examples of the organic substituent having 1 to 20 carbon atoms and optionally containing a heteroatom, as $R^{a6}$ to $R^{a8}$, are the same as the specific examples and preferable examples of the organic substituent having 1 to 20 carbon atoms and optionally containing a heteroatom, as X, respectively. In addition, a group represented by the formula (a1b), wherein $R^{a6}$ to $R^{a8}$ each independently represent a hydrocarbon group having 1 to 20 carbon atoms, is also preferable as the organic substituent having 1 to 20 carbon atoms and optionally containing a heteroatom, as $R^{a6}$ to $R^{a8}$. When the organic substituent having 1 to 20 carbon atoms and optionally containing a heteroatom, as $R^{a6}$ to $R^{a8}$, is the group represented by the formula (a1b), preferable examples thereof include —N=P(Me)$_3$, —N=P(Et)$_3$, —N=P(n-Pr)$_3$, —N=P(iso-Pr)$_3$, —N=P(n-Bu)$_3$, —N=P(iso-Bu)$_3$, —N=P(sec-Bu)$_3$, —N=P (tert-Bu)$_3$ and —N=P(Ph)$_3$. Among these, —N=P(tert-Bu)$_3$ and —N=P(iso-Pr)$_3$ are preferable, and —N=P(tert-Bu)$_3$ is more preferable. In the formulas, Me represents a methyl group, Et represents an ethyl group, n-Pr represents an n-propyl group, iso-Pr represents an iso-propyl group, n-Bu represents an n-butyl group, iso-Bu represents an isobutyl group, sec-Bu represents a sec-butyl group, tert-Bu represents a tert-butyl group, and Ph represents a phenyl group.

Further, specific examples of the inorganic substituent as $R^{a6}$ to $R^{a8}$ are the same as the specific examples of the inorganic substituent as $R^{a1}$ to $R^{a5}$.

Preferable examples of the group represented by the formula (a1b) include —N=P(Me)$_3$, —N=P(Et)$_3$, —N=P(n-Pr)$_3$, —N=P(iso-Pr)$_3$, —N=P(n-Bu)$_3$, —N=P(iso-Bu)$_3$, —N=P (sec-Bu)$_3$, —N=P (tert-Bu)$_3$, —N=P(Ph)$_3$, —N=P(—N=P (tert-Bu)$_3$) Ph$_2$ and —N=P(—N=P (iso-Pr)$_3$) Ph$_2$. Among these, —N=P (tert-Bu)$_3$ and —N=P (iso-Pr)$_3$ are preferable, and —N=P(tert-Bu)$_3$ is more preferable.

Preferable specific examples of the metal-containing compound represented by the formula (a1), as described above, include the following metal-containing compounds. Incidentally, M in the following formulas is the same as M in the formula (a1). In addition, in the following formulas, Si(Me)$_3$ represents a trimethylsilyl group, and Si (Me)$_2$tert-Bu represents a tert-butyldimethylsilyl group.

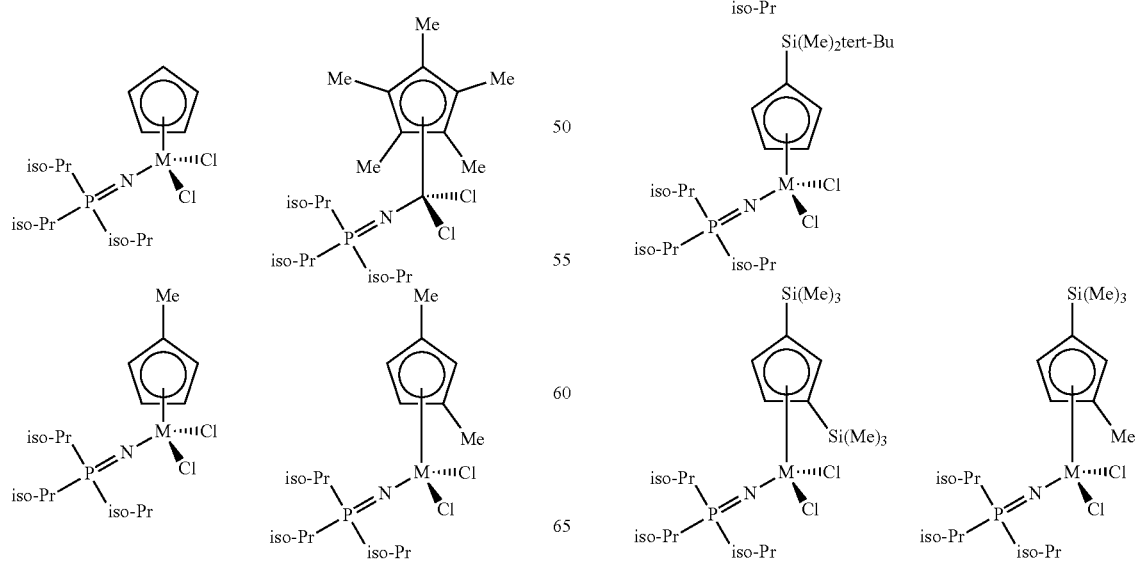

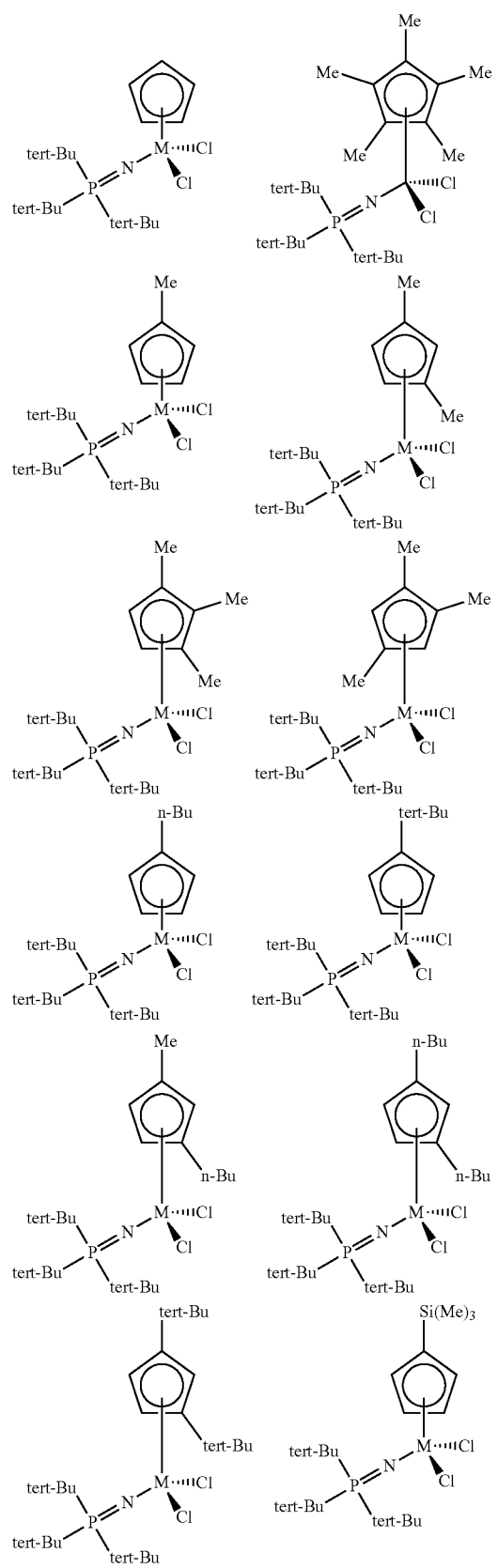
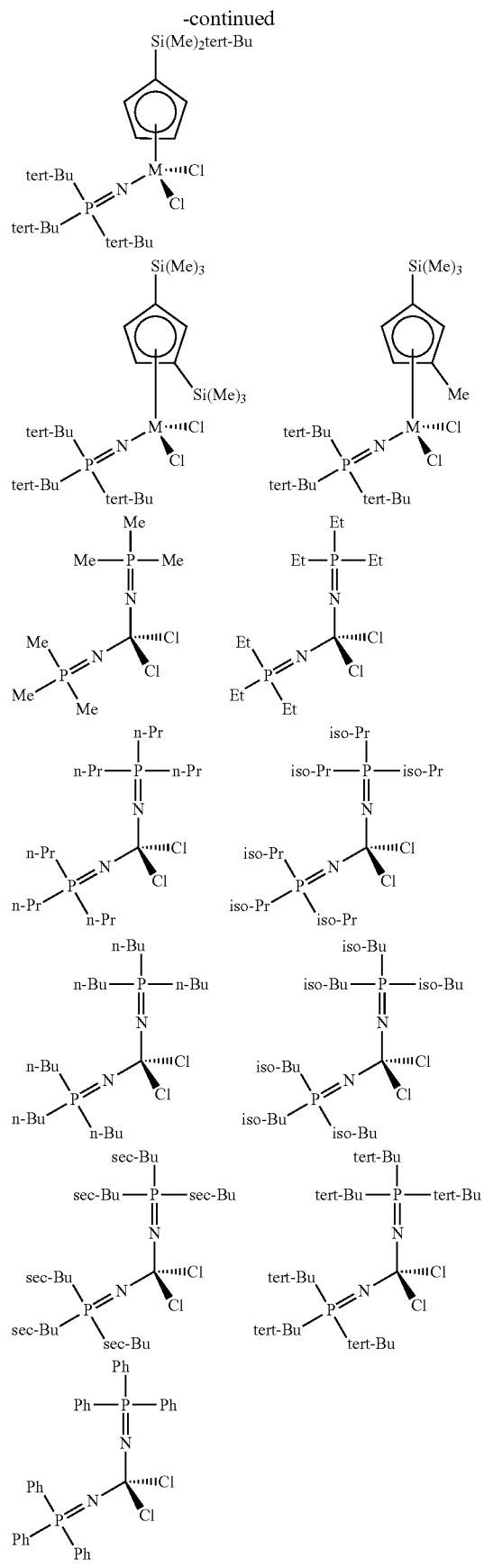

The polymerization of the monomers is preferably performed in the presence of the metal-containing catalyst as described above and a co-catalyst. A compound which is generally used as a co-catalyst in the polymerization of olefins can be used as the co-catalyst of the present invention without particular limitation. Suitable examples of the co-catalyst include an aluminoxane and an ionic compound. The polymerization of the monomers is preferably performed, in particular, using at least one of the aluminoxane and a borate compound as the ionic compound as the co-catalyst, in light of favorable progress of the polymerization reaction.

Thus, the metal-containing catalyst described above is preferably mixed with the aluminoxane and/or the ionic compound to give a catalyst composition. In this regard, the ionic compound is a compound that forms a cationic transition metal compound through the reaction with the metal-containing catalyst.

The catalyst composition is preferably prepared using a solution of the metal-containing catalyst. A solvent contained in the solution of the metal-containing catalyst is not particularly limited. Examples of a preferable solvent include hydrocarbon solvents such as pentane, hexane, heptane, octane, isooctane, isododecane, mineral oils, cyclohexane, methylcyclohexane, decahydronaphthalene (decalin), mineral oils, benzene, toluene and xylene, and halogenated hydrocarbon solvents such as chloroform, methylene chloride, dichloromethane, dichloroethane and chlorobenzene.

The amount of the solvent used is not particularly limited so long as a catalyst composition having the desired performance can be produced. Typically, an amount of solvent is used such that the concentration of the metal-containing catalyst, the aluminoxane and the ionic compound is preferably 0.00000001 to 100 mol/L, more preferably 0.00000005 to 50 mol/L, and particularly preferably 0.0000001 to 20 mol/L.

In mixing liquids containing basic ingredients of the catalyst composition, the liquids are preferably mixed such that a value of $(M_{b1}+M_{b2})/M_a$, wherein $M_a$ represents the number of moles of the transition metal element in the metal-containing catalyst, $M_{b1}$ represents the number of moles of aluminum in the aluminoxane, and $M_{b2}$ represents the number of moles of the ionic compound, is preferably 1 to 200,000, more preferably 5 to 100,000, and particularly preferably 10 to 80,000.

The temperature at which the liquids containing the basic ingredients of the catalyst composition are mixed is not particularly limited, and is preferably −100 to 100° C., and more preferably −50 to 50° C.

The mixing of a solution of the metal-containing catalyst with the aluminoxane and/or the ionic compound for the preparation of the catalyst composition may be performed prior to the polymerization in an apparatus separate from the polymerization vessel, or may be performed prior to or during the polymerization in the polymerization vessel.

In the following, materials used in the preparation of the catalyst composition, and conditions for the preparation of the catalyst composition will be described.

[Aluminoxane]

Various aluminoxanes which have conventionally been used as a co-catalyst, etc. in the polymerization of various olefin can be used as the aluminoxane of the present invention without particular limitation. Typically, the aluminoxane is an organic aluminoxane. In the production of the catalyst composition, one type of the aluminoxane may be used alone, and two or more types of aluminoxanes may be used in combination.

An alkylaluminoxane is preferably used as the aluminoxane. Examples of the alkylaluminoxane include a compound represented by the following formula (b1-1) or (b1-2). The alkylaluminoxane represented by the following formula (b1-1) or (b1-2) is a product of the reaction of trialkylaluminum with water.

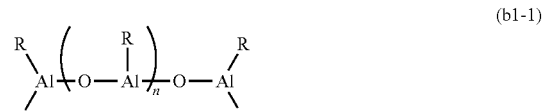
(b1-1)

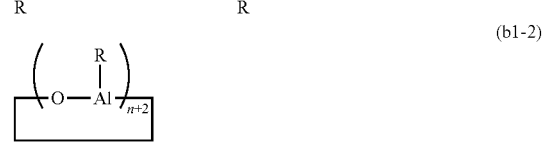
(b1-2)

In the formulas (b1-1) and (b1-2), R represents an alkyl group having 1 to 4 carbon atoms, and n represents an integer of 0 to 40, preferably 2 to 30.

The alkylaluminoxane includes methylaluminoxane, and a modified methylaluminoxane in which a part of methyl groups in the methylaluminoxane are replaced with another alkyl group. The modified methylaluminoxane is preferably, for example, a modified methylaluminoxane having, as a replacing alkyl group, an alkyl group having 2 to 4 carbon atoms, such as an ethyl group, a propyl group, an isopropyl group, a butyl group and an isobutyl group, and, in particular, more preferably a modified methylaluminoxane in which a part of methyl groups in the methylaluminoxane are replaced with an isobutyl group. Specific examples of the alkylaluminoxane include methylaluminoxane, ethylaluminoxane, propylaluminoxane, butylaluminoxane, isobutylaluminoxane, methylethylaluminoxane, methylbutylaluminoxane, methylisobutylaluminoxane, etc., and among these, methylaluminoxane and methylisobutylaluminoxane are preferable.

The alkylaluminoxane can be prepared by any known method. Alternatively, commercially available products of the alkylaluminoxane may be used. Examples of the commercially available products of the alkylaluminoxane include MMAO-3A, TMAO-200 series, TMAO-340 series, solid MAO (each manufactured by Tosoh Finechem Corporation) and a methylaluminoxane solution (manufactured by Albemarle Corporation), etc. More preferably, an alkylaluminoxane other than solid MAO is used in light of the tendency toward reliable suppression of the formation of the polyethylene-like impurity.

[Ionic Compound]

The ionic compound forms a cationic transition metal compound upon the reaction with the metal-containing catalyst. An ionic compound having an ion such as a tetrakis(pentafluorophenyl)borate anion, an amine cation having an active proton such as dimethylphenylammonium cation $((CH_3)_2N(C_6H_5)H^+)$, a trisubstituted carbonium cation such as $(C_6H_5)_3C^+$, a carborane cation, a metal carborane cation and a ferrocenium cation having a transition metal may be used as the ionic compound.

Suitable examples of the ionic compound include a borate. Specific examples of a preferable borate include trityl tetrakis(pentafluorophenyl)borate, dimethylphenylammonium tetrakis(pentafluorophenyl)borate and an N-methyldialkylammonium tetrakis(pentafluorophenyl)borate such as N,N-dimethylanilinium tetrakis(pentafluorophenyl)borate and N-methyldi-n-decylammonium tetrakis(pentafluorophenyl)borate.

Further, one or more selected from an aluminoxane and an alkylaluminum compound are preferably contained in the polymerization vessel prior to the addition of the metal-containing catalyst, or the catalyst composition containing the metal-containing catalyst, in light of the tendency toward the production of the cyclic olefin copolymer in favorable yields.

The aluminoxane is as described in relation to the production method of the catalyst composition. An alkylaluminum compound which has been conventionally used in the polymerization of olefins or the like can be used as the alkylaluminum compound of the present invention without particular limitation. Examples of the alkylaluminum compound include a compound represented by the following general formula (II):

$(R^{10})_z AlX_{3-z}$ (II)

wherein in the formula (II), $R^{10}$ represents an alkyl group having 1 to 15 carbon atoms, preferably 1 to 8 carbon atoms, X represents a halogen atom or a hydrogen atom, and z represents an integer of 1 to 3.

Examples of the alkyl group having 1 to 15 carbon atoms include a methyl group, an ethyl group, an n-propyl group, an isopropyl group, an n-butyl group, an isobutyl group, an n-octyl group, etc.

Specific examples of the alkylaluminum compound include: trialkylaluminums such as trimethylaluminum, triethylaluminum, triisopropylaluminum, tri-n-butylaluminum, triisobutylaluminum, tri-sec-butylaluminum and tri-n-octylaluminum; dialkylaluminum halides such as dimethylaluminum chloride and diisobutylaluminum chloride; dialkylaluminum hydrides such as diisobutylaluminum hydride; and dialkylaluminum alkoxides such as dimethylaluminum methoxide.

In the case where the aluminoxane is added to the polymerization vessel prior to the addition of the metal-containing catalyst, or the catalyst composition containing the metal-containing catalyst, the amount of the aluminoxane used is preferably 1 to 1,000,000 moles, and more preferably 10 to 100,000 moles in terms of the number of moles of aluminum in the aluminoxane per mole of the metal-containing catalyst. In the case where the alkylaluminum compound is added to the polymerization vessel prior to the addition of the metal-containing catalyst, or the catalyst composition containing the metal-containing catalyst, the amount of the alkylaluminum compound used is preferably 1 to 500,000 moles, and more preferably 10 to 50,000 moles in terms of the number of moles of aluminum per mole of the metal-containing catalyst.

The polymerization is preferably performed in the presence of the metal-containing catalyst and the aluminoxane, or in the presence of the metal-containing catalyst, the ionic compound and the alkylaluminum.

The polymerization conditions are not limited, so long as a cyclic olefin copolymer having the desired physical properties, and any known conditions may be employed. The amount of the catalyst composition used is derived from the amount of the metal-containing compound used in the preparation of the catalyst composition. The amount of the catalyst composition used per mole of the norbornene monomer is preferably 0.000000001 to 0.005 moles, and more preferably 0.00000001 to 0.0005 moles in terms of the amount of the metal-containing compound used in the preparation of the catalyst composition.

The polymerization time is not particularly limited, and the polymerization is performed until the desired yield is reached or the molecular weight of the polymer is increased to the desired degree. The polymerization time also varies depending on the temperature, the catalyst composition and the monomer composition, and is typically 0.01 h to 120 h, preferably 0.1 h to 80 h, and more preferably 0.2 h to 10 h.

It is preferable that at least a part, and preferably the entirety, of the catalyst composition is continuously added to the polymerization vessel. The continuous addition of the catalyst composition allows for continuous production of the cyclic olefin copolymer, and leads to the reduction of production costs of the cyclic olefin copolymer.

The method described above can efficiently produce the cyclic olefin copolymer by copolymerizing the monomers including the norbornene monomer and ethylene while suppressing the formation of a polyethylene-like impurity. The glass transition temperature of the resulting cyclic olefin copolymer is not particularly limited, and is, for example, preferably 185° C. or lower, more preferably 160° C. or lower, even more preferably 130° C. or lower, still more preferably 120° C. or lower, and particularly preferably 100° C. or lower. Further, when a sample of the cyclic olefin copolymer produced according to the method described above is subjected to the measurement according to the method defined in JIS K7121 using a differential scanning calorimeter (DSC) in a nitrogen atmosphere under the condition of a rate of temperature increase of 20° C./min, the obtained DSC curve preferably shows no peak of the melting point (enthalpy of fusion) assigned to the polyethylene-like impurity. This means no or very little polyethylene-like impurity in the cyclic olefin copolymer. It should be noted that in the presence of the polyethylene-like impurity in the cyclic olefin copolymer, a peak of the melting point assigned to the polyethylene-like impurity on the DSC curve will be generally detected in the range of 100° C. to 140° C.

The cyclic olefin copolymer produced according to the method described above contains a trace amount of the polyethylene-like impurity and is excellent in transparency. Therefore, the cyclic olefin copolymer produced according to the method described above is particularly preferably used for, e.g., materials of optical films or sheets, and films or sheets for packaging materials, which are required to have a high degree of transparency from the viewpoints of optical function and aesthetics.

EXAMPLES

In the following, the present invention is specifically described with reference to Examples, but the present invention is not limited to these Examples.

Examples 1 to 17, and Comparative Examples 1 to 3

In Examples 1 to 15, the compound C1 shown below was used as a metal-containing catalyst in the production of a cyclic olefin resin composition.

(C1)

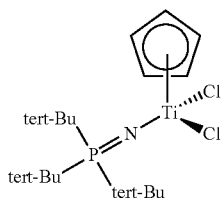

In Examples 16 to 17, the compound C2 shown below was used as a metal-containing catalyst.

(C2)

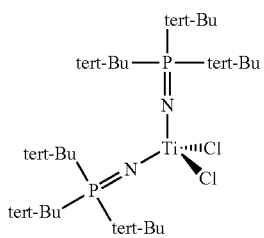

In Comparative Examples 1 to 3, the compound C3 shown below was used as a metal-containing catalyst.

(C3)

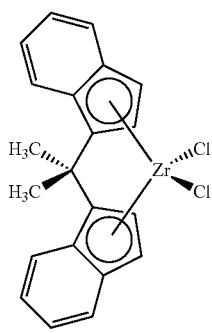

In the Examples and Comparative Examples, the following co-catalysts were used.

CC1: a 6.5% by mass (in terms of the content of the Al atom) MMAO-3A solution in toluene (a solution of a methylisobutylaluminoxane represented by $[(CH_3)_{0.7}(iso\text{-}C_4H_9)_{0.3}AlO]_n$; from Tosoh Finechem Corporation; this solution contained 6 mol % of trimethylaluminum based on the total Al)

CC2: a 9.0% by mass (in terms of the content of the Al atom) TMAO-211 solution in toluene (a solution of methylaluminoxane; from Tosoh Finechem Corporation; this solution contained 26 mol % of trimethylaluminum based on the total Al)

CC3: N-methyldialkylammonium tetrakis(pentafluorophenyl)borate (alkyl: C14 to C18 (average: C17.5) (from Tosoh Finechem Corporation)

CC4: triisobutylaluminum (from Tosoh Finechem Corporation)

To a 150 mL, adequately-dried stainless-steel autoclave containing a stirring bar were added a polymerization solvent specified in Table 2 and 2-norbornene in an amount specified in Table 2 (30 to 160 mmol). Then, a co-catalyst specified in Table 1 was added as described below. In Examples 1 to 7 and Comparative Examples 1 to 3, CC1 or CC2 was added. In Examples 8 to 17, CC4 was added, followed by the addition of the solution of the metal-containing catalyst, and thereafter CC3 was added. The solution of the metal-containing catalyst was prepared in toluene. After the addition of the co-catalyst as described above, the autoclave was heated until the polymerization temperature specified in Table 2 was reached, and then the solution of the metal-containing catalyst was added such that the amount of the metal-containing catalyst was as specified in Table 1. Then, an ethylene pressure (gauge pressure) of 0.9 MPa was applied, and the time when 30 seconds had elapsed after the application of the ethylene pressure was considered to be the polymerization starting point. However, in Examples where CC3 was used in combination, the solution of the metal-containing catalyst was added such that the amount of the metal-containing catalyst was as specified in Table 1, then the solution of CC3 prepared in the polymerization solvent specified in Table 2, and thereafter an ethylene pressure (gauge pressure) of 0.9 MPa was applied. Incidentally, the total volume of the monomer solution immediately before the application of the ethylene pressure was 80 mL. Fifteen minutes after the start of the polymerization, the ethylene feed was stopped, the pressure was carefully reduced to the atmospheric pressure, and then isopropyl alcohol was added to the reaction solution to quench the reaction. Subsequently, the polymerization solution was poured into a solvent mixture of 300 mL of acetone, 200 mL of methanol or isopropyl alcohol, and 5 mL of hydrochloric acid to precipitate the copolymer. The copolymer was collected via suction filtration, followed by washing with acetone and methanol, and then the copolymer was dried in vacuo at 110° C. for 12 h, to give a copolymer of norbornene and ethylene. The copolymer yield (kg) per gram of the catalyst, which is calculated from the amount of the catalyst used and the amount of the copolymer obtained thus, is listed in Table 2.

In addition, the measurement of the glass transition temperature, the thermal analysis of a polyethylene-like impurity, and a turbidity test were performed according to the following methods. The results of these measurements and the test are listed in Table 2.

<Glass Transition Temperature (Tg)>

The Tg of the cyclic olefin copolymer was measured according to the DSC method (the method defined in JIS K7121). DSC apparatus: differential scanning calorimeter (DSC-Q1000, manufactured by TA Instrument)

measurement atmosphere: nitrogen
condition for temperature increase: 20° C./min

<Thermal Analysis for Impurity>

The amount of exotherm (mJ/mg) was calculated based on an area of a peak assigned to the melting point of the polyethylene-like impurity, which was observed in the range of 100° C. to 140° C. on the DSC curve obtained in the measurement of the glass transition temperature. A larger calculated amount of exotherm indicates a higher content of the polyethylene-like impurity. It should be noted that "ND" in Table 2 indicates that no peak assigned to the melting point of the polyethylene-like impurity was detected on the DSC curve.

<Turbidity Test>

After the dissolution of 0.1 g of the obtained cyclic olefin copolymer in 10 g of toluene, the presence or absence of the turbidity in the solution was observed. The case where the turbidity was found was determined to be B, whereas the case where the turbidity was not found was determined to be A.

TABLE 1

|  | Catalyst | | Co-catalyst | Molar ratio: CC1/Transition metal | Molar ratio: CC2/Transition metal | Molar ratio: CC3/Transition metal | Molar ratio: CC4/Transition metal |
|---|---|---|---|---|---|---|---|
|  | Type | Amount (μmol) | | | | | |
| Ex. 1 | C1 | 0.5 | CC1 | 5000 | — | — | — |
| Ex. 2 | C1 | 0.5 | CC1 | 5000 | — | — | — |
| Ex. 3 | C1 | 0.5 | CC1 | 5000 | — | — | — |
| Ex. 4 | C1 | 0.5 | CC1 | 2000 | — | — | — |
| Ex. 5 | C1 | 0.5 | CC1 | 5000 | — | — | — |
| Ex. 6 | C1 | 0.5 | CC1 | 5000 | — | — | — |
| Ex. 7 | C1 | 0.5 | CC1 | 5000 | — | — | — |
| Ex. 8 | C1 | 0.5 | CC3/CC4 | — | — | 3 | 2000 |
| Ex. 9 | C1 | 0.5 | CC3/CC4 | — | — | 3 | 2000 |
| Ex. 10 | C1 | 0.5 | CC3/CC4 | — | — | 3 | 500 |
| Ex. 11 | C1 | 0.5 | CC3/CC4 | — | — | 3 | 500 |
| Ex. 12 | C1 | 0.5 | CC3/CC4 | — | — | 3 | 500 |
| Ex. 13 | C1 | 0.5 | CC3/CC4 | — | — | 3 | 500 |
| Ex. 14 | C1 | 0.5 | CC3/CC4 | — | — | 3 | 500 |
| Ex. 15 | C1 | 0.5 | CC3/CC4 | — | — | 3 | 500 |
| Ex. 16 | C2 | 0.5 | CC3/CC4 | — | — | 3 | 500 |
| Ex. 17 | C2 | 0.5 | CC3/CC4 | — | — | 3 | 500 |
| Comp. Ex. 1 | C3 | 1.8 | CC2 | — | 1000 | — | — |
| Comp. Ex. 2 | C3 | 2.0 | CC2 | — | 1200 | — | — |
| Comp. Ex. 3 | C3 | 1.8 | CC2 | — | 900 | — | — |

TABLE 2

|  | Amount of 2-norbornene charged (mmol) | Polymerization solvent | Polymerization temperature (° C.) | Tg (° C.) | Thermal analysis for impurity (mJ/mg) | Copolymer yield per gram of catalyst (kg/g) | Turbidity test |
|---|---|---|---|---|---|---|---|
| Ex. 1 | 30 | Isododecane | 90 | 25 | N.D. | 14 | A |
| Ex. 2 | 45 | Isooctane | 90 | 42 | N.D. | 13 | A |
| Ex. 3 | 60 | Decalin | 90 | 57 | N.D. | 13 | A |
| Ex. 4 | 85 | Decalin | 90 | 79 | N.D. | 13 | A |
| Ex. 5 | 110 | Decalin | 90 | 104 | N.D. | 12 | A |
| Ex. 6 | 150 | Decalin | 90 | 145 | N.D. | 10 | A |
| Ex. 7 | 160 | Toluene | 90 | 151 | N.D. | 18 | A |
| Ex. 8 | 45 | Decalin | 90 | 50 | N.D. | 15 | A |
| Ex. 9 | 90 | Decalin | 90 | 79 | N.D. | 13 | A |
| Ex. 10 | 90 | Decalin | 90 | 88 | N.D. | 19 | A |
| Ex. 11 | 90 | Decalin | 100 | 83 | N.D. | 23 | A |
| Ex. 12 | 90 | Toluene | 100 | 96 | N.D. | 62 | A |
| Ex. 13 | 90 | Decalin | 120 | 77 | N.D. | 24 | A |
| Ex. 14 | 90 | Decalin | 140 | 71 | N.D. | 17 | A |
| Ex. 15 | 70 | Toluene | 90 | 83 | N.D. | 66 | A |
| Ex. 16 | 70 | Toluene | 90 | 91 | N.D. | 10 | A |
| Ex. 17 | 120 | Toluene | 90 | 77 | N.D. | 11 | A |
| Comp. Ex. 1 | 90 | Isododecane | 90 | 72 | 0.18 | 6 | B |
| Comp. Ex. 2 | 90 | Isooctane | 90 | 81 | 0.11 | 2 | B |
| Comp. Ex. 3 | 90 | Decalin | 90 | 77 | 0.10 | 5 | B |

It can be seen from Tables 1 and 2 that in the production of a cyclic olefin copolymer by the polymerization of monomers including a norbornene monomer and ethylene in the presence of a metal-containing catalyst, the use of a metal-containing catalyst having a structure in which a nitrogen atom is bonded to a transition metal of Group 4 of the periodic table (Ti) and a transition metal of Group V of the periodic table (P) results in efficient production of the cyclic olefin copolymer, while suppressing the formation of a polyethylene-like impurity. Since a cyclic olefin copolymer yield of 10 kg or more per gram of the catalyst can be achieved, the production method is practically preferable. On the other hand, in Comparative Example 1 where a metal-containing compound not having a structure in which a nitrogen atom is bonded to a transition metal of Group 4 of the periodic table (Ti) and a transition metal of Group V of the periodic table (P) was used as a catalyst, the cyclic olefin copolymer yield per gram of the catalyst was significantly lower than 10 kg, and, in addition, failed to suppress the formation of the polyethylene-like impurity.

The invention claimed is:

1. A method for producing a cyclic olefin copolymer comprising a structural unit derived from a norbornene monomer and a structural unit derived from ethylene, the method comprising:
    charging at least the norbornene monomer and the ethylene as monomers into a polymerization vessel, and polymerizing the monomers in the polymerization vessel in presence of a metal-containing catalyst, the metal-containing catalyst having a structure in which a nitrogen atom is bonded to a transition metal of Group 4 of periodic table and an atom of Group 15 of periodic table, wherein the metal-containing catalyst is a metal-containing compound represented by formula (a1):

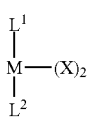

(a1)

wherein in the formula (a1), M represents Ti, Zr or Hf, X represents an organic substituent having 1 to 20 carbon atoms and optionally containing a heteroatom, or a halogen atom, $L^1$ represents a group represented by formula (a1a) or (a1b):

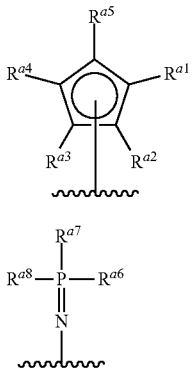

(a1a)

(a1b)

wherein in the formula (a1a), $R^{a1}$ to $R^{a5}$ are identical to or different from one another, and each independently represent a hydrogen atom, an organic substituent having 1 to 20 carbon atoms and optionally containing a heteroatom, or an inorganic substituent, two groups adjacent on the 5-membered ring of $R^{a1}$ to $R^{a5}$ are optionally bonded to each other to form a ring, wherein in the formula (a1b), $R^{a6}$ to $R^{a8}$ are identical to or different from one another, and each independently represent a hydrogen atom, an organic substituent having 1 to 20 carbon atoms and optionally containing a heteroatom, or an inorganic substituent, two groups selected from $R^{a6}$ to $R^{a8}$ are optionally bonded to each other to form a ring, wherein the organic substituent as $R^{a6}$ to $R^{a8}$ in the formula (a1b) is a group selected from an alkyl group having 1 to 20 carbon atoms, an alkoxy group having 1 to 20 carbon atoms, a cycloalkyl group having 3 to 20 carbon atoms, an aliphatic acyl group having 2 to 20 carbon atoms, a benzoyl group, an α-naphthylcarbonyl group, a β-naphthylcarbonyl group, an aromatic hydrocarbon group having 6 to 20 carbon atoms, an aralkyl group having 7 to 20 carbon atoms, a trialkylsilyl group having 3 to 20 carbon atoms, a monosubstituted amino group substituted with a hydrocarbon group having 1 to 20 carbon atoms, and a disubstituted amino group substituted with a hydrocarbon group having 1 to 20 carbon atoms, and $L^2$ represents the group represented by the formula (a1b)), and wherein the norbornene monomer is one or more selected from a norbornene and a substituted norbornene represented by formula (I):

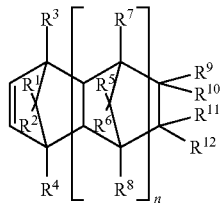

(I)

wherein in the formula (I), $R^1$ to $R^8$ are identical to or different from one another, and are selected from the group consisting of a hydrogen atom, a halogen atom, and an alkyl group having 1 to 20 carbon atoms, $R^9$ to $R^{12}$ are identical to or different from one another, and are selected from the group consisting of a hydrogen atom, a halogen atom, an alkyl group having 1 to 20 carbon atoms, a cycloalkyl group, an unsubstituted aromatic hydrocarbon group, and an aralkyl group, $R^9$ and $R^{10}$ or $R^{11}$ and $R^{12}$ are not taken together to form a divalent hydrocarbon group, $R^9$ or $R^{10}$ and $R^{11}$ or $R^{12}$ optionally form a ring with each other, the ring that $R^9$ or $R^{10}$ and $R^{11}$ or $R^{12}$ form is not a ring having a double bond, n represents 0 or a positive integer, when n is two or more, $R^5$ to $R^8$ are identical to or different from each other in the respective repeating units, and when n is 0, at least one of $R^1$ to $R^4$ and $R^9$ to $R^{12}$ is not a hydrogen atom.

2. The method for producing a cyclic olefin copolymer according to claim 1, wherein the atom of Group 15 of the periodic table is a phosphorus atom.

3. The method for producing a cyclic olefin copolymer according to claim 1, wherein the transition metal of Group 4 of the periodic table is Ti.

4. The method for producing a cyclic olefin copolymer according to claim 1, wherein the polymerizing of the monomers is performed in the presence of the metal-containing catalyst and a co-catalyst.

5. The method for producing a cyclic olefin copolymer according to claim 4, wherein the co-catalyst comprises at least one of an aluminoxane and a borate compound.

6. The method for producing a cyclic olefin copolymer according to claim 1, wherein the polymerizing of the monomers is performed in the presence of a hydrocarbon solvent.

7. The method for producing a cyclic olefin copolymer according to claim 1, wherein a DSC curve obtained in measurement of a sample of the cyclic olefin copolymer according to a method defined in JIS K7$^{121}$ using a differential scanning calorimeter in a nitrogen atmosphere under a condition of a rate of temperature increase of 20° C./min shows no peak of a melting point assigned to a polyethylene-like impurity in a range of 100° C. to 140° C.

* * * * *